United States Patent [19]

Ekstrand

[11] 4,402,605

[45] Sep. 6, 1983

[54] FIREARMS SIGHTING INSTRUMENT

[75] Inventor: Arne Ekstrand, Helsingborg, Sweden

[73] Assignee: Aimpoint AB, Malmo, Sweden

[21] Appl. No.: 233,597

[22] PCT Filed: Mar. 17, 1980

[86] PCT No.: PCT/SE80/00080

§ 371 Date: Nov. 19, 1980

§ 102(e) Date: Nov. 7, 1980

[87] PCT Pub. No.: WO80/02069

PCT Pub. Date: Oct. 2, 1980

[30] Foreign Application Priority Data

Mar. 19, 1979 [SE] Sweden ................... 7902413

[51] Int. Cl.³ .................. G02B 27/34; G02B 27/36
[52] U.S. Cl. .................................................. 356/252
[58] Field of Search ........................... 356/251–255

[56] References Cited

U.S. PATENT DOCUMENTS 3,942,901 3/1976 Ekstrand ................ 356/252

FOREIGN PATENT DOCUMENTS 927009 3/1955 Fed. Rep. of Germany ...... 356/252

Primary Examiner—Vincent P. McGraw
Attorney, Agent, or Firm—Blair, Brown & Kreten

[57] ABSTRACT

The present invention relates to a sight with an optical sighting instrument which includes a lens device with a concave, semi-transparent mirror which is disposed to reflect the image of a light source into the field of view of an eye which is directed towards the concave side of the mirror and observes a target through the lens device.

According to the invention, the lens device (1–3), in which the mirror (1) is included, is optically combined with a second lens device (4) which is movably disposed with respect thereto, both lens systems (1–3 and 4) together forming one optical system which is substantially zero-refractive, that is to say neither magnifying nor reducing, and the second lens device is adjustable in two directions which are substantially at right angles to each other and to the major axis (O–F) of the concave mirror surface.

4 Claims, 2 Drawing Figures

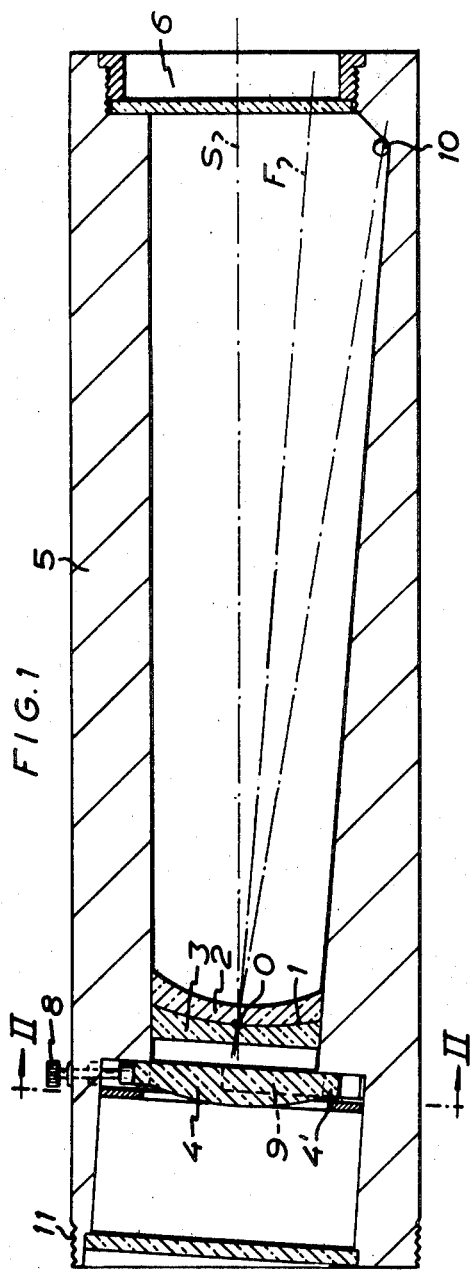
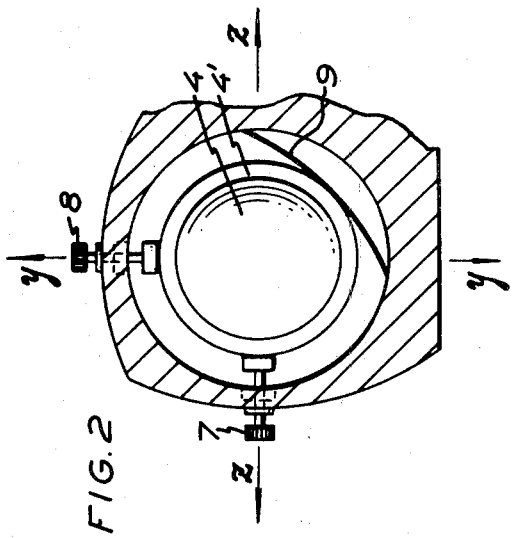

FIREARMS SIGHTING INSTRUMENT

The present invention relates to optical sighting instruments and, in particular but not exclusively, to sighting instruments of the type described in Swedish Pat. No. 371,491 and U.S. Pat. No. 3,942,901, that is to say relatively simple, lightweight sighting instruments which are primarily intended for use together with light firearms, for example hunting rifles, and permit rapid and precise aiming of the firearm.

Optical sighting instruments of this type comprise a housing with a rear sight aperture and a lens device disposed in front of and spaced from the sight aperture, the lens device having a concave mirror surface which is provided to serve as a semi-transparent mirror and is turned to face towards the sight aperture, and a light source which is located in or adjacent the focal plane of the semi-transparent mirror surface of the lens device and is directed towards the concave face of the mirror surface such that the mirror surface produces, from the light from the light source, a virtual image which is perceived by the eye of the marksman as a sighting mark located far ahead of the lens device.

The object of the present invention is to facilitate adjustment of a sighting instrument of the above-disclosed type mounted on, for example, a rifle, without the need to alter the position of the entire instrument (a frame in the form of a housing with the lens system and light source) in relation to the barrel of the rifle.

It is known, in, for example, mirror optics with a lens mirror as projection element, to use a lens member for compensating refractive error in the occurrence of refractive forces.

A further object of the present invention is to utilize a portion of the refraction-compensating lens device as a means for making possible adjustment of the sighting instrument in relation to that object, for example a rifle barrel, on which the sighting instrument is mounted, without the need to alter the adjustment of the frame (housing) of the sighting instrument.

These objects have now been attained in that the sighting instrument according to the invention possesses the characteristic features disclosed in appended claim 1.

The invention will be described in greater detail below with reference to the accompanying drawing, in which FIG. 1 illustrates, in schematic axial section, an optical sighting instrument according to the present invention, the sighting instrument comprising a lens system with a mirror and mutually movably disposed lenses in a housing which is intended to be mounted on a rifle barrel and comprises adjustment means and other requisite components such as light source and battery, and FIG. 2 is schematic cross-section taken along the line III—III in FIG. 2.

In the lens system illustrated in FIG. 1, the concave, spherical mirror is disposed as an interface 1 between two connected lenses 2, 3, of which the one lens 2 is convavo-convex and the other lens 3 is concavo-planar, counting from the focal point F of the mirror 1. The convex face of the concavo-convex lens 2 and the concave face of the concavo-planar lens 3 abuts against each other with the mirror surface, consisting of a very thin layer, disposed as an interface between the two abutting lens surfaces. The lenses 2 and 3 are fixed in relation to each other by means of, for example, cement.

In the embodiment in FIG. 1, the plano-concave lens composed of the two lenses 2 and 3 forms a reducing lens which compensates for refractive error from the mirror. For redressing the image reduction so that the total lens system neither reduces nor magnifies, a plano-convex lens 4 is mounted in front of the lens unit 1, 2, 3, the magnifying power of the lens 4 counteracting the reduction caused by the combined lens 2, 3. Both of the lenses 2, 3 have been considerably polished for obviating spherical aberration and may consist of different materials for correcting chromatic aberrations. The lens 4 renders the system as a unit non-refractive and has a further important function.

A lens system with a lens mirror as projection element and two lenses for eliminating spherical aberration and for ensuring zero refraction can be produced by the simplest manner by means of the two united lenses 2,3, in which event the lens 3 should be concavo-convex or plano-concave and compensate for the reduction by the lens 2. Instead, the present invention calls for the use of two discrete lenses 3, 4 of which the lens 4 is movably disposed with respect to the lens 3 and, thus, with respect to the unit consisting of the two lenses 2, 3 and the mirror 1.

The illustrated lens system is intended to be mounted in a housing 5 of, for example, the type illustrated in FIG. 1, with the concave face of the mirror 1 turned towards a sight aperture 6 at one end of the housing.

The lens member 4 which, together with the lens member 3 forms a refraction-correcting device for the lens 2 and the mirror surface 1, is movable along two perpendicular axes which are both at right angles to the major axis O–F of the mirror 1.

If a bright point is disposed at the focal point F, the dot will be reflected by the mirror surface 1 and be projected parallel to the major axis O–F of the mirror in a known manner such that the image of the bright dot will be perceived as lying at a great distance in front of the lens system by an eye stationed behind the lens system, that is to say behind the concave mirror surface 1.

If the lens member 4 is moved on one or the other of the two perpendicular axes Y or Z (see FIG. 2), the image of the object observed through the lens system will follow this movement. In this manner, the sight can be adjusted for correcting elevation and lateral errors in a very simple manner, without its being necessary to alter the position of the instrument housing 5 with respect to, for example, a rifle barrel.

As is apparent from FIGS. 1 and 2, the adjustment device for the lens member 4 may consist of two adjustment screws 7, 8 which are disposed at right angles with respect to each other in threaded passages in the walls of the housing 5, the inner ends of the screws abutting against the circumferential surface of a lens mounting 4'. At a third point, the lens member 4 rests against a leaf spring 9 whose ends are secured in the housing such that the central portion of the leaf spring 9 forms a yieldable support surface for the lens member 4. It will be readily appreciated that the lens member 4 can be adjusted along the Y and Z axes by means of the two screws 7, 8.

The requisite clearance between the circumferential edge of the lens member 4 and the inner circumferential surface of the housing 5, and, in other words the requisite adjustment distances by means of the screws 7, 8, need not exceed approximately 5 mm in sights used for normal hunting rifles. In a sight according to the invention of normal length for a hunting rifle and zero refraction in the lens system 1-4, a useful rule of thumb is to allow that an adjustment of the lens member 4 along one of the two axes Y, Z by a distance of 1 mm corresponds to a target offset in the same direction of approximately 0.5 m at a range of 100 m. In this case, a possibility for movement of 3 mm along the Y and X axes permits a correction of a rifle sight of 1.5 m in the lateral direction and 1.5 m In the vertical direction for a target distance of 100 m, which is sufficient in most cases.

Thus, the instrument according to the invention makes possible complete inner correction of a sight without positional alteration of the sight on a bearing member, such as a rifle barrel.

The adjustment device illustrated in FIG. 2 is both practical and simple and permits adjustment in accordance with calibrated scales, but any other suitable device whatever for adjustment of the member 4 in two directions which are at right angles to each other and to the major axis O-F of the mirror may be used.

It was mentioned above that the concave face of the mirror 2 is turned towards the sight aperture 6 in the housing 5 and that a bright dot placed in the focal point F of an observer stationed behind the sight aperture 6 appears to lie at infinite distance ahead of the lens system.

Even though, in the sight according to the present invention, use is made of a very small light source, such as a light emitting diode 10 of miniature dimensions, the light source takes up a certain amount of space. It is inappropriate to place the light emitting diode in the line of sight O-S between the sight aperture 6 of the housing 5 and the center point O of the mirror, since the view of the observer would be obstructed and the sighting mark would not be seen. Consequently, the lens system is located in such a position that the major axis O-F of the mirror makes an angle with respect to the line of sight O-S. Preferably, a plane along the axis O-F and the line O-S coincides with the point where the light source (the light emitting diode) 10 is located, and preferably a line from the light source (the light emitting diode) 10 at right angles to the line O-S is bisected by the axis O-F. If the lens system is inclined so that the focal point of the mirror lies at a light source 10 which, in order not to obstruct view, is placed adjacent to or even built into the inner circumferential surface of the housing 5, an eye at a distance from the sight aperture of the housing 5 which is usual for the sight in question can only see a very limited field, as will be readily appreciated and as is, besides, described in Swedish patent application No. 12736/71, to which reference is made for a closer study of this problem.

As is shown in FIG. 1, the housing 5 is provided with a threaded connection 11 at its outer end for accommodating suitable light filters.

The sight according to the invention is extremely well suited for rifle shooting at dusk and in conditions of almost darkness. As long as a target can be observed at all in the dark, a weapon can be aimed at the target with the assistance of the sight according to the invention.

Because of this property in the sight according to the invention, it may be desirable to prevent dazzling of a marksman in the event of the sudden appearance of powerful light. The illustrated thread connection 11 may be utilized for accommodating a suitable filter which rapidly darkens on the incidence of light and darkens to a degree corresponding to the light power. Such filters are generally available on the market and usually possess the same properties as modern sunglasses. However, special filters are also known which react more quickly to the sudden incidence of light than does the eye itself. By the use of filters of this type and by providing, at the sight aperture, a suitable blinker device conforming to the face of the marksman, the marksman can aim even under poor light conditions without the risk of being dazzled in the event that his field of view is suddenly illuminated, as may, for example, occur when a marksman is shooting from a dark background through an area which may suddenly be illuminated by sunlight, such as a forest glade. Naturally, other situations are conceivable such as sudden searchlight beams, flares etc. during darkness, if the sight is used in conjunction with military weapons.

It is possible to dispose the lens which is movable along the Y and Z axes so as to be movable and adjustable also along the axis O-F for correction of magnification or reduction errors.

I claim:

1. An optical sighting instrument having a sighting axis and comprising a housing (5) having forward and rear apertures and a lens system supported within the housing between and spaced apart from each of said apertures, the lens system comprising lens means and a concave, substantially spherical semi-transparent mirror surface facing said rear aperature, the focal point (F) of the mirror being located in the housing between said mirror surface and said rear aperture, the sighting instrument further comprising a light source (10) in the form of a small light emitting diode directed towards the concave mirror surface for generating a sighting mark which seems, to an eye looking from behind said rear aperture (6) of the housing, to lie at a great distance in front of the sight, the lens system including a first lens device in which said mirror surface is included as a part and which has a predetermined refraction, and a refraction redressing second lens device which renders the entire lens system substantially zero-refractive, said second lens device being movably and adjustably supported in the housing, a carrier for movably supporting said second lens device, said carrier comprising means for adjusting said second movable lens device in relation to said first lens device and in relation to said sighting axis in two mutually perpendicular directions which are each substantially perpendicular in relation to a major axis (O-F) of the mirror, such that the sighting instrument thereby is adjustable in the vertical and lateral directions by optical inner adjustment without positional alteration of the housing with respect to a carrier member for the housing, for example with respect to a rifle barrel, said adjustment means comprising three supporting means for three-point suspension of said second lens device, two of said three supporting means being substantially perpendicularly spaced and adjustable each along one of two perpendicular axes, and the third of said three supporting means forming a substantially plane supporting surface at a peripheral point of said second lens device for accommodating said adjustment thereof effected by said two adjustment means.

2. Sighting instrument according to claim 1, characterized in that said first lens device which comprises said mirror surface, is reducing and is fixedly disposed in the housing, whereas said second lens device is magnifying to substantially the same degree as the reducing power of said first lens device.

3. Sighting instrument according to claim 2, characterized in that said first lens device comprises a concavo-convex first lens portion and a plano-concave second lens portion which are interconnected with the convex surface of said first lens portion facing the convex surface of said second lens portion and with said mirror surface interposed therebetween as a thin layer, so that said first and second lens portion together form a plano-concave lens having said semi-transparent mirror surface integrated therein, and in that said second lens device has the form of a plano-convex lens positioned so as to have its planar surface spaced from the planar surface of said first lens device and facing the latter.

4. A sighting instrument according to claim 1, characterized in that said third planar supporting means for elastically yieldably maintaining the second lens device (4, 4') in abutment against said two adjustable supporting means is a leaf spring which rests against the circumferential edge of said second lens device.

* * * * *